Dec. 7, 1965   G. BADALINI   3,221,571
POWER-RECOVERY CONTINUOUS HYDRAULIC CHANGE SPEED
GEAR, PARTICULARLY SUITABLE FOR VEHICLES
Filed March 15, 1963   3 Sheets-Sheet 1

Giovanni Badalini
INVENTOR.
BY Wenderoth, Lind,
and Ponack
Attorneys

United States Patent Office 3,221,571
Patented Dec. 7, 1965

3,221,571
POWER-RECOVERY CONTINUOUS HYDRAULIC CHANGE SPEED GEAR, PARTICULARLY SUITABLE FOR VEHICLES
Giovanni Badalini, Rome, Italy, assignor to Cambi Idraulici Badalini S.p.A., Rome, Italy
Filed Mar. 15, 1963, Ser. No. 265,492
Claims priority, application Italy, June 8, 1962,
11,378/62
3 Claims. (Cl. 74—472)

The present invention relates to a power recovry continuous hydraulic change speed gear, particularly suitable for vehicles.

In the continuous hydraulic change speed gears forming the subject matter of other patents of the same applicant, the base control of the change of the drive ratio is obtained by modifying by means of a suitable servo control the piston displacement of the hydraulic motor.

In said gears, in fact, the drive ratio is given by the formula:

$$R = \frac{\text{Piston displacement of the motor}}{\text{Piston displacement of the pump}} + 1$$

whereby changing from zero to a maximum the piston displacement of the motor, the change of the drive ratio will be obtained respectively from 1 to a maximum.

This maximum ratio, for a motor car is about 4, whereby as it results from the formula, the hydraulic motor would have a maximum piston displacement three times the piston displacement of the pump.

By changing the displacement of the sole hydraulic motor, all the band of the ratios is obtained at constant pressure assuming the imput torque as constant.

A motor car runs for a very high percent of its use either at ratio of 1:1 or at a ratio very close to 1:1, in very high rotational speed conditions and under full motive torque. Under these conditions of run, the size of the hydraulic motor, even if with zero displacement or almost zero, due to the high rotational speed and the high pressure to which said hydraulic motor is submitted, remarkably affect the efficiency of the drive.

In order to reduce the size of the hydraulic motor, although obtaining the desired maximum drive ratio, it is necessary to diminish the displacement of the pump, accepting, of course, an increase of pressure when the pump is no more at its maximum displacement.

This pressure increase will bring about a diminution of the volumetric efficiency, and this can be at once admitted due to the reduced permanence of the car under these conditions (maximum ratio).

The variable displacement pump affords the possibility of obtaining a perfect "idle" (by arranging the pump at zero displacement) and of obtaining the reverse movement (by arranging the pump at negative displacement i.e. reversing the flow from the pump).

According to this invention, a continuous hydraulic change speed gear is provided comprising in combination an axial piston hydraulic pump, operatively associated to the main engine and mounted in a rotary casing rigid with the output shaft, and a hydraulic motor, also provided with axial pistons, slidable within cylinders provided in said pump casing, the casing of said motor being stationary and forming the outer casing of the unit.

This invention will be hereinafter described with reference to the attached drawings showing only by way of non limitative example, one preferred embodiment of the invention.

Figure 1:
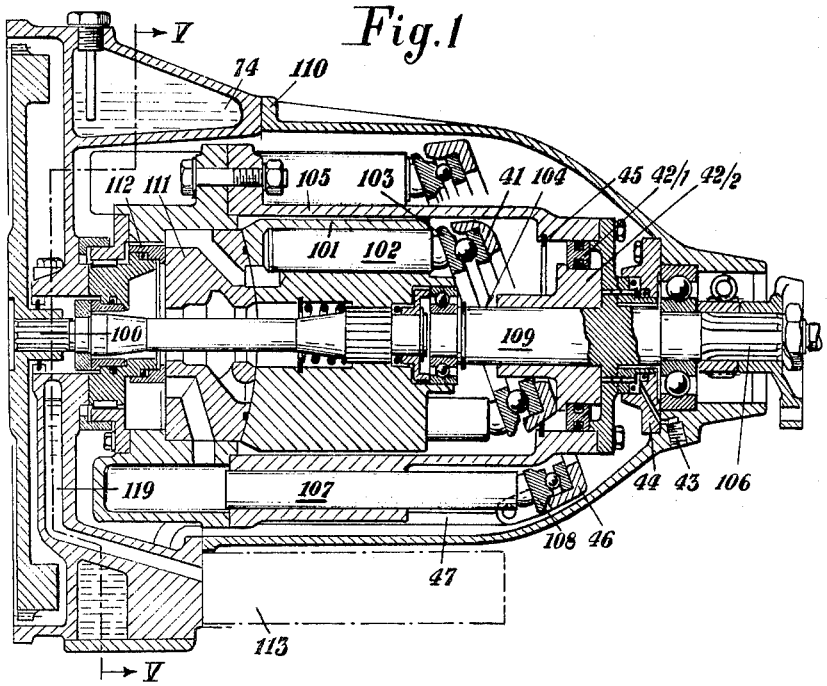
FIG. 1 is a longitudinal sectional view of the change speed gear.

With reference to FIG. 1, the input shaft is 100 which rotates by means of the terminal spline the cylinder body 101 of the pump. Within the cylinder body are received a plurality of pistons 102 resting by means of a pivoted runner, onto the surface of the thrust bearing 103, carried in turn by the variable inclination plate 41. Said variable inclination plate 41 is pivoted according to the axis 104 on the rotary casing 105 which on one side ends with a grooved shaft 106 (being the output shaft) and contains the chambers within which glide the pistons 107 of the hydraulic motor. Said pistons rest onto the front surface of the bearing 108 in turn carried by the variable inclination plate 46 pivoted at 109 onto the outer casing 110 of the change speed gear.

The delivery of the oil of the pump is carried out between two spherical surfaces (that of the pump being convex, while that of the distributor 111 is concave), while the distribution of the motor is carried out by means of the eccentric ring 112.

Figure 2:
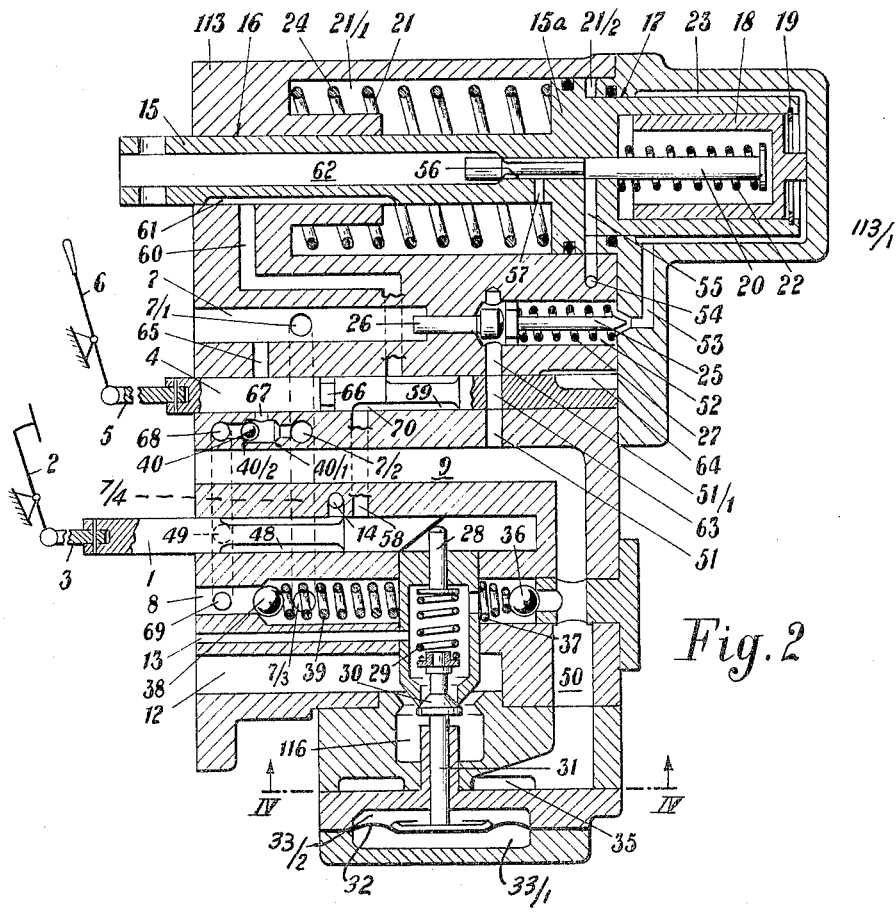
FIG. 2 is a sectional view of the unit denoted by the numeral reference 113 of FIG. 1, in an enlarged scale with respect to FIG. 1.

The plate 41 of the pump is operated in order to change the inclination thereof by the pistons 42/1 and 42/2 toward one direction, while the return movement will be obtained automatically, being the axis of its pivots 104 displaced, instead of passing through its centre, so that the resultant of the thrust of the pistons 102 will cause the operation thereof. To the jacks 42 the oil will come from the rotary oil intake 44 connected to said jacks by the duct 43. The stroke of the piston 42/1 is limited by the stop 45 provided on the rotary casing. The plate 46 of the hydraulic motor will be controlled, on the contrary, by means of the connecting rod 47, by the jack 15 located in the block 113 the sectional view of which is shown in FIG. 2.

Summarizing, while the plate of the hydraulic motor must be only operated for changing the ratios from 1:1 to a certain value, the plate of the pump must be able to have four well determined positions and precisely:

(1) Reverse motion-Negative inclination.
(2) Idle—Zero inclination
(3) Reduced forwards speed—Partial positive inclination.
(4) Normal forwards speed—Total positive inclination.

During the whole band of operation of the hydraulic motor, the plate of the pump must be located in the last cited position. See FIG. 1.

As the whole pump unit of the gear is located within the rotary casing 105 in order to cause the plate of the pump to take the aforesaid four positions, it will be possible to act only onto the duct 43 which is connected to the rotary oil intake 44. Also the oil control device in the duct 43 is contained within the block 113 shown in FIG. 2.

The same device provides also to automatically operate the jack 15 of the hydraulic motor in such a manner that depending upon the resistance met by the vehicle to its forwards motion and depending upon the aperture of the carburetor throttle, the gear will change its ratio, causing the internal combustion engine to run always at its optimum rotational speed for each condition of admission and permitting thus the driver to control the speed of the car by operating only the accelerator pedal.

In said block will be also contained the members capable of provide when the driver operates a suitable lever 6:

(a) to disconnect the automatic mechanism of the hydraulic motor, locking the ratio of the gear at the desired position in order to retain the car on a slope or for the run on frozen or slippery road.

(b) to increase at will the ratio of the gear so as to exploit the braking effect of the engine, as well as to open a branched duct allowing the start in particularly severe conditions due to the engine in bad conditions, or due to a very cold temperature.

(c) to predispose the reverse motion.

As the block 113 is in contact with the casing of the gear, to said block lead directly the various ducts of the change speed gear and precisely: See also FIG. 5.

The duct 7 which is connected to the gear circuit where the pressure is created when the internal combustion engine is braking (said circuit will be termed PMF).

The duct 8 which is connected to the gear circuit where the pressure is created when the internal combustion engine is tractive (said circuit will be termed PMT). See below under the heading "Filling circuit of the change speed gear."

The duct 9 which is connected to the filling circuit of the gear (i.e. with the circuit of the low pressure supplementary pump 76 (FIG. 4) serving the purpose of creating at the suction side of the main pump the pressure necessary for the return of the pistons and for eliminating the air from the ducts).

Figure 4:
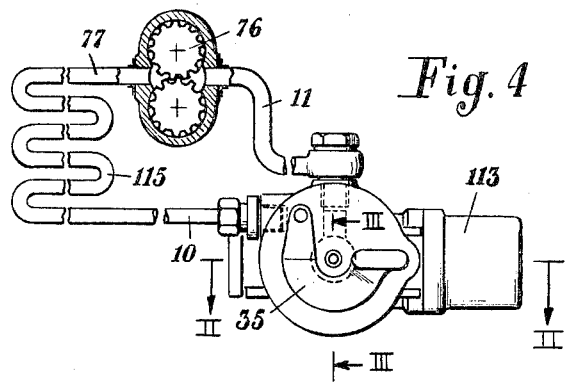
FIG. 4 is a sectional view taken along the plane IV—IV of FIG. 2 with the diagrammatical indication of the feeding circuit.

The duct 10 wherefrom comes the oil deriving from the filling pump 76 after having passed through the cooler 115 (FIG. 4).

The duct 11 which constitutes the suction duct of the filling pump (FIG. 4).

Figure 5:
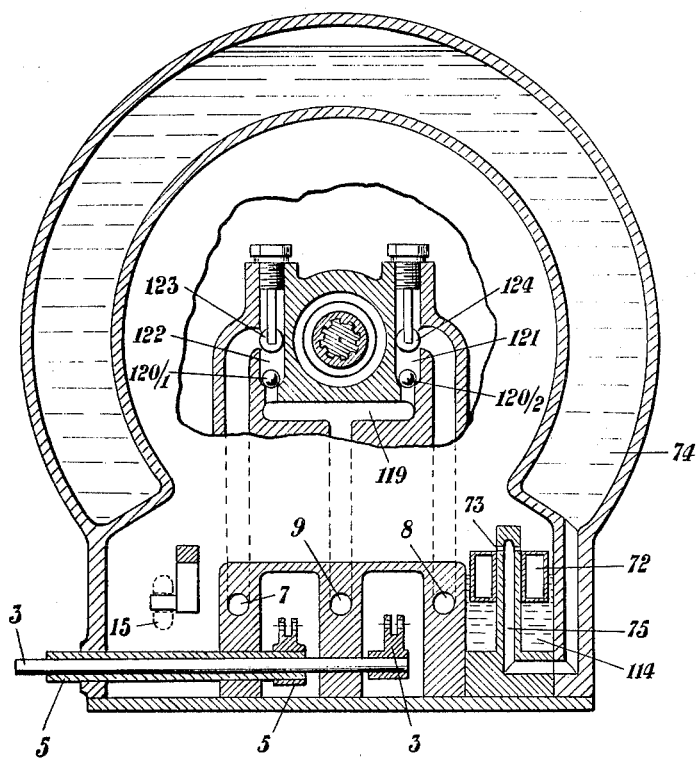
FIG. 5 is a sectional view taken along the line V—V of FIG. 1.

The duct 12 which communicates with the sump 114 inside the outer casing of the gear (FIG. 5).

The capillary duct 13 which is connected to the reservoir 74 of the oil of the gear (FIG. 5).

The duct 14 which is connected to the duct 43 connecting the block 113 to the rotary oil intake 44 (FIG. 1).

The jack 15 operates the plate 46 of the hydraulic motor by means of the connecting rod 47.

The plunger of the jack 15 is guided in 16 and 17. From the outlet side from the guide 16 is provided the connection of the connecting rod 47, while from the outlet side from the guide 17 the plunger 15 is so shaped as to carry a piston 18 which can be moved through a stroke limited by the "seeger" ring 19. The plunger 15 is bored and within said plunger slides a distributor 20 which, by a gauged spring 22, pushes the piston 18. The greater diameter portion of the plunger 15 slides within the chamber 21 dividing it into the parts 21/1 and 21/2. The portion containing the piston 18 is located within the chamber 23.

A spring 24 pushes always the plunger 15 towards the chamber 23.

A valve adjusts the braked pressure.

It consists of a needle element 25 whereon acts a little piston 26. A gauged spring 27 pushes the valve to its open position and precisely towards the little piston 26.

A distributor 4 is connected by a lever system 5 to a lever 6 which can be located under the steering wheel of the car. A distributor 1 connected by means of a lever set 3 to the accelerator 2 has one end with an inclined cut so that during its operaton it will move the push rod 28 acting on the spring 29 which in turn operates the poppet valve 30.

Figure 3:
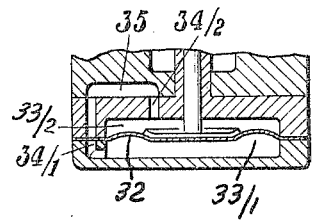
FIG. 3 is a detail view of a particular detail of FIG. 2 in a different cross section.

The guide 31 of the aforesaid valve rests onto the membrane 32 contained within the recess subdivided into the two chambers 33/1 and 33/2. The chambers 33/1 and 33/2 are connected respectively by means of the ducts 34/1 and 34/2 (FIG. 3) to the outer and inner point of a radial section of a horse shoe duct 35 (better shown in FIG. 4).

In the unit 113 are provided the valves as follows:

A fixed gauge adjusting valve for low pressure consisting of a ball 36 and a gauged spring 37.

A fixed gauge adjusting valve for high pressure consisting of a ball 38 and a gauged spring 39.

A double check valve consisting of the ball 40 and which can close the two seats 40/1 and 40/2.

In the connection element of the speed change gear to the engine as shown in FIG. 5, an annular reservoir 74 is provided fed by the capillary duct 13. The reservoir is connected to the sump 114 through the pipe 75 the head of which is closed, and provided with the holes 73 located in its cylindrical surface. Longitudinally with respect to said pipe and thereby guided slides the float 72 so that when the level causes the float to raise, it shuts off the holes 73, while when the level decreases, said holes will be open again.

The diagram of FIG. 4 shows also the connection of the filling pump 76 which is connected for suction to the pipe 11 and for delivery to the pipe 77 so that the oil, after having passed through the radiator 115 will reach the duct 10 of the change speed gear block.

*Operation*

The operation of the hydraulic pump rigid with the input shaft 100 and of the hydraulic motor rigid with the output 106 will not be described in detail as it is known from previous patents of the same applicant such as No. 2,777,286 granted January 15, 1957.

Hereinafter the operation of the change speed gear control will be described for each position of the lever 6 and therefore of the distributor 4.

*Lever 6 in automatic operation position*

(Position of the distributor 4 as shown in FIG. 2)

The pedal be assumed in its released position and accordingly also the distributor 1 in its position shown in FIG. 2. Also the engine be assumed running and the car stationary. When the pedal is released, the chamber 48 of the distributor 1 causes the duct 49 (branched from PMT duct 8) to communicate with the duct 14 which through the rotary oil intake 44 leads to the piston 42/1 and 42/2 (FIG. 1). The piston 42/2 (while the piston 42/1 is held stationary by the stop 45) acts upon the plate 41 into the direction towards the negative inclination, but when the plate reaches the position perpendicular to the axis of rotation, the absolute PMT will reach the value zero and therefore the plate will stop its movement in said position. Thus a complete absence of drive is obtained as the possible drive caused by the PMT would cause the plate to be inclined into the direction to annul said drive.

Obviously if the car is located on an inclined surface tends to move into either direction according to the inclination of the surface and the plate will reach the correct inclination with no influence by the internal combustion engine which is assumed to be running, into the gliding of the car (absolute PMT always zero).

The hydraulic motor under these conditions would have to be at its maximum piston displacement in order to be ready to start (plate 46 at its full inclination and therefore the plunger 15 all in). This will occur as being the engine running at its minimum operation the delivery of the filling pump will be also minimum and minimum will be the speed of the oil within the horse shoe duct 35.

Under these conditions the membrane 32 due to the little difference of pressure existing by said low speed between the ducts 34/1 and 34/2 (said pressure differential is low since it is due to the centrifugal force) will exert a little thrust onto the poppet valve 30. The filling oil moves through the ducts 10–35–50, the fixed gauge valve 36 and the variable gauge valve 30. Due to the low gauge of the last cited valve, also the filling pressure will be a low pressure. But the filling oil, besides the main purpose of filling the change speed gear, through the duct 9–51–63–51/1–52–53 enters into the chamber 23 and acts upon the piston 18. Being low its pressure it will not be able to overcome the action of the spring 22 and therefore the distributor 20 will be fully pushed rightwards. Under this condition the pressurized oil which always reaches the chamber 21/2 through the duct 54 (coming from the valve 40) passing through the hole 55, into the chamber 56 and into the hole 57 will enter into the chamber 21/1. As the sectional area of this chamber is greater than that of the chamber 21/2 the plunger 15 will be pushed fully rightwards and therefore, as it as to be demonstrated, the motor is at its full piston displacement.

The spring 24 has the sole purpose of balancing the thrust deriving from the filling pressure within the chamber 23 and of rendering more quick the operation of the plate in case of stop of the engine while the change speed gear is not at its maximum ratio.

When the accelerator is depressed the distributor 1 will move rightwards and the annular chamber 48 will connect the hole 14 to the hole 58 shutting off the communication with the hole 49. The hole 58, through the passageway 70 and the chamber 59, the duct 60 and the groove 61 of the control plunger of the hydraulic motor is under these conditions connected to the chamber 21/1.

Within the chamber 21/1 prevails continuously an intermediate pressure due to the fact that its cross sectional area is greater than that of the chamber 21/2 wherefrom it takes the oil. The intermediate pressure must be capable of balancing the thrust of the pressure onto the cross sectional area of the chamber 21/2. In fact in the contrary case, the plunger 15 would move and the distributor 20 which we can consider as stationary, would put the hole 57 into communication with the hole 55 or with the hole 62 (exhaust) so as to re-establish the equilibrium. Summarizing when the pedal 2 is depressed the jacks 42/1 and 42/2, controlling the plate of the pump, are pushed by a pressure which is about one half of the PMT of the considered instant, and therefore the plunger 42/2 will no more be in position of holding by itself the plate in perpendicular position and accordingly the plate will tilt until abutting against the other piston 42/1 which causing the thrust pressure to be doubled, will cause the plate to be arrested at an intermediate position (reduced speed position).

It is to be noted that in the PMT ducts, in the absence of PMT, prevails the filling pressure, and therefore when a halving is cited for the PMT, under these conditions, it is meant the halving of the filling pressure.

But when the accelerator pedal is pressed also the throttle of the carburettor will be opened and the revolutions of the main engine will increase. Thus also the delivery of the filling pump 76 will increase, increasing the centrifugal pressure within the hole 34/1, increasing the thrust of the membrane onto the valve 30 and finally increasing the value of the filling pressure.

Within the chamber 23 the increase of the filling pressure causes the yield of the spring 22 and the consequent movement of the distributor 20. The hole 57 is connected to the exhaust through the chamber 56 and the hole 62 and the plunger 15 will move leftwards starting controlling the connecting rod 47 to reduce the piston displacement of the hydraulic motor.

As soon as the plunger 15 moves leftwards, the recess 61 will no more be in communication with the chamber 21/1 and said recess will be communicating with outside whereby the hole 58 will be connected to the exhaust. Therefore also the duct 14 and therefore the two pistons 42/1 and 42/2 will be connected with the exhaust and the plate under the action of the tendency deriving from the displacement of the fulcrum axis will reach its maximum inclination (normal speed).

Due to both the effect of the greater inclination of the pump plate and the diminution of the piston displacement of the hydraulic motor (both having as result a diminution of the drive ratio), the tendency to increase the number of revolutions of the main engine will be limited. More specifically, the said engine will be in position of reaching (and maintaining) the number of revolutions corresponding to a filling pressure having such a value to perfectly balance, by its thrust onto the piston 18, the action of the spring 22 and holding in shut off position the distributor 20.

In fact should the number of revolution tend to change (for instance due to a different slope of the road) also would change with a direct proportionality the centrifugal pressure onto the membrane 32 and therefore the filling pressure within the chamber 23 whereby the distributor 20 would move with a consequent displacement of the plunger which would cause either a diminution or an increase of the ratio according to the increase or diminution respectively of the number of revolutions of the engine, carrying again said number of revolutions to the pre-established value.

This would cause the engine to run at a constant number of revolutions.

However, as the pedal 2 is depressed, due to the wedge shape of the end of the distributor 1, through the tappet rod 28 the spring 29 will be loaded acting in reverse direction against the thrust of the membrane 32.

Thus a constant revolution number engine run is obtained when the pedal is held stationary (and accordingly when the open position of the carburettor throttle is held constant).

When the pedal is further depressed, the number of revolutions will be stabilized at a higher number as it will be necessary a greater centrifugal pressure onto the membrane 32 in order to annul the greater load of the spring 29 and bring again thus the filling pressure to its base value.

The contrary operation occurs of course as a lesser depression of the accelerator pedal is concerned.

Finally, therefore, the internal combustion engine, during the run, will have always a well determined number of revolutions, according to the aperture of the throttle valve of the carburettor, following thus the smallest specific consumption and best performance operating curve.

When the car is running, when the accelerator pedal will be released, the hole 14 is again put into communication with the hole 49 of the chamber 48, but the pump plate will remain inclined since the tendency of the plate to remain inclined will continue due to the displacement of the fulcrum axis and to the thrust of pistons in PMF, and to the fact that in the hole 49, connected to PMF, no pressure exists. Due to the release of the tappet rod 28 by the distributor 1, the engine would tend to stabilize at a low number of revolutions and thus if it is conducted at a high speed of revolution by the movement of the car the change speed gear will tend to reach the minimum ratio (1:1).

*Lever 6 in position of "blocked ratios"*

When the lever 6 is moved from the "automatic" position to the "blocked ratios" position, the distributor 4 will move leftwards (FIG. 2). The hole 51 will no more correspond to the hole 63 provided in said distributor and thus the communication with the chamber 23 will be shut off.

Accordingly the ratio of the gear will no more be able to change and it will be that established at the blocking moment, so as to have a rigid drive either on a descent or on slippery or frozen ground.

*Lever 6 in "increase of ratio" position*

When the lever 6 is moved from the "blocked ratio" position to that of "increase of ratio," the distributor 4 moves further leftwards, so that the hole 51/1 will be connected to exhaust by the recess 64.

This would cause a sudden annulment of the pressure within the chamber 23 and consequently an immediate tilting of the hydraulic motor plate and finally an immediate decrease of the gear ratio.

This shifting would cause a very remarkable braking effect with the consequent racing of the internal combustion engine whereon finally discharges said braking effect.

The valve 25 serves the purpose of avoiding an excessive braking action. In fact, if the braking pressure (PMF) overcomes a certain limit, the piston 26 on which acts the PMF existing in the duct 70 overcomes the action of the gauged spring 27 and the valve shuts off the duct 53. Therefore ceases the exhaust of the oil into the chamber 23 and ceases consequently the increase of the braking effect; if, on the contrary, the braking effects tends to diminish the hole 53 will open and the change speed gear will insist in its shifting.

Summarizing, by setting the lever 6 at the position of shifting of the gear, a constant pressure braking action will be obtained throughout the band of ratios controllable by the hydraulic motor.

The pump plate, as aforesaid, cannot diminish its inclination during the braking avoiding thus the operation in braking condition, with very high ratios and thus in non reversable drive ratios.

Further under these lever conditions, the distributor 4 connects by its annular chamber 66, the PMF hole 65 to the hole 67. This connection causes no variation of the braking conditions, as the PMF from the hole 67 cannot reach the PMT hole 68–69–8 (causing thus a short circuit) as it is impeded by the ball valve 40. The short circuit will be on the contrary embodied when the main engine is tractive as the PMT from 8–69–68 by moving the ball 40 can reach the hole 67. This circuit with tractive engine serves the purpose of rendering easy the start when being the internal combustion engine very cold and scarcely effective, even with a reduced inclination of the pump plate, under particular conditions of start, said engine would have a tendency to stop.

Of course, when passed beyond the critic starting moment, said circuit will be annulled by moving the lever 6 to its "blocked ratio" or "automatic" positions.

*Lever 6 in "reverse motion" position*

By moving the lever 6 from the "increase of ratio" position to the "reverse motion" position, the distributor 4 leaves always the hole 51/1 connected to exhaust through the recess 64 ensuring thus that the hydraulic motor will be at its maximum piston displacement.

For the control of the pump plate, the duct 58, through the chamber 59–70 is connected to the hole 67 which is under pressure both if the plate is inclined in the normal motion direction. (PMT coming from 8–69–68) and in the contrary direction (PMT coming from 7–7/1–7/4–7/2). The ball 40 shutting off towards the seat 40/1 or 40/2 respectively will avoid the by pass. Therefore, while with the accelerator released the pump plate, as for the forwards run is located perpendicularly to the axis of rotation or in any case in conditions of null PMT, with the lever in its "reverse motion" position, by depressing the accelerator, the piston 42/2 will be also in PMF. It is evident that under these conditions the pressure will be no more annulled at the moment when the plate passes through the plane perpendicular to the axis of rotation and said plate tends to reach, pushed by the piston 42/2 its negative maximum inclination and the change speed gear will take its fixed reverse motion ratio.

Of course, releasing the accelerator, carrying again the distributor 1 to the only PMT the piston 42/2, the car comes to stop.

*Maximum pressure limiting valve*

In the block shown in FIG. 2, it is noted the valve 38 shutting off the PMT duct 8 by means of a gauged spring 39. The chamber where the spring is received is connected to the PMF circuit through the holes 7/3–7/4–7/1.

The purpose of this valve is mainly that of allowing the maximum effort under conditions of maximum torque of the change speed gear.

The spring of this valve is gauged at such a value that said valve opens when the main engine is at full torque conditions, and the pump plate has the "reduced" inclination. When depressing the accelerator, the plate starts inclinating, if the resistance at the wheels is very high, the car do not move at once, as for a very reduced cylinder capacity of the pump the pressure raises immediately at values higher than that of gauging of the valve and the same valve short circuits the change speed gear. As the plate inclines, although remaining the gear at constant pressure, the output torque increases as to the torque of the hydraulic motor adds the reaction torque of the pump (which, due to the constant pressure, increases with the inclination of the plate). When the pump has reached the cylinder capacity whereby, at the gauging pressure of the valve, it takes up the full torque of the internal combustion engine (and which corresponds to the "reduced" position of the plate), the maximum output torque of the gear is obtained. It is evident that if the considered valve was not present, the car would move as soon as the plate would depart from the perpendicularity condition and therefore practically under the sole torque supplied by the hydraulic motor, with no utilization at the start of the features of the hydraulic gears according to the inventions of the applicant, i.e. that of having available on the secondary, besides the torque of the hydraulic motor, also the torque transmitted by reaction to said secondary shaft by the pump as the latter is mounted on a rotary casing.

*Filling circuit of the change speed gear*

The outer filling circuit (FIGS. 4 and 5) comprises filling pump 76 operated by the engine by an auxiliary shaft said pump sucking from the duct 11 and delivering to a radiator 115 located normally in front of the car. From the radiator the oil comes back to the duct 10 aforerecited.

From the duct 10, through the horse shoe duct 35 and the hole 50 the oil comes to fill the change speed gear through the duct 9, (FIGS. 2 and 5), the recess 119, the hole 121 and the duct 124 if the gear is under tractive conditions (as the duct 124 is in PMF). From the recess 119 the oil moves to the hole 122 and to the duct 123 if the gear is under braking conditions (as the duct 123 is in PMT). The check ball valves 120/1 and 120/2 prevent the pressure from coming back from the two high pressure circuits (PMT and PMF) to the filling circuit which under low pressure.

From the duct 50 the filling pressure moves to the hole 51 for the above described controls.

The delivery excess of the filling pump (i.e. the delivery not required by the gear) is discharged through the fixed gauge valve 36 (FIG. 2) and through the poppet valve 30 into the chamber 116 which communicates with the duct 11 (FIG. 4). But, as the duct 11 communicates with the suction side of the filling pump, the excess oil will return to the pump through a closed circuit.

However one portion of the pump oil enters into the change speed gear, into the duct contrary to that used for transmitting the power, in order to replace the losses of volume and finally will collect into the sump 114 (FIG. 5) located in the lowest portion of the outer casing of the gear.

From the above it is evident that the oil returning to the filling pump would be no more sufficient to a complete filling of the pump. The duct 12, branched from the sump 114 carries back the seepages from the gear to the suction of the pump. In order to improve the suction of the pump from the sump, the duct 12 leads to the chamber 116 by an annular chamber with conical generatrices, at the center of which arrives the oil from the valves 36 and 30 so that finally the oil is sucked from the duct 12 and this to the purpose of improving the filling of the filling pump.

Thus the circuit would be completed as the delivery of the filling pump comes back, partially directly (through the valves) and partially indirectly (through the seepages of the gear, the sump and the duct 12) to said pump.

But the amount of oil capable of being contained within the sump is too limited by the size of said sump (due to reasons of minimum height from the road level and of slope of the path and of either longitudinal or transversal accelerations, the size of the sump must be reduced to a minimum if the rotary part of the gear has not to be immersed into the oil), whereby, it is necessary a supplemental reservoir which in FIG. 1 has been shown having an annular form in order to utilize the volume which otherwise would not be utilizable in the zone of the connecting flange of the gear to the engine.

This reservoir 74 supplies the sump through the duct 75. The float 72, opening or closing the holes 73 feed the sump causing the oil not overcome the established level.

However, by described arrangement, the oil of the reservoir would never go to work within the gear and further unavoidable losses in the closure of the holes 73 by the float, would cause in the time the oil of the reservoir to diverse from the sump reaching the rotary casing.

In order to avoid this drawback, a pipe 13 having a very little sectional area picks up the oil from the chamber of the spring 29 carrying it back to the reservoir. By this pipe a third passageway has been created for the oil of the filling pump, (one portion of said oil coming back in short circuit through the valves 36 and 30, while another part consists of the seepages of the gear), and therefore the amount of the oil sucked by the duct 12 will be increased so that the floater will never shut off the holes 73 but will allow through said holes the passage of the oil lacking from the filling pump as it has been taken up by the duct 13.

By this system, even if due to a long inactivity of the car, the oil would have all moved into the reservoir, few minutes of operation would be sufficient to bring again to the right operation level the sump 114.

The oil of the duct 13 is taken up downstream of the valve 36 and before the valve 30. The purpose of taking up said oil downstream of the fixed gauge valve 36 is that of non creating in the filling circuit a free outlet which could bring to an eccessive lowering of the filling pressure (dangerous mainly for the return of the pistons of the main pump) mainly with a very hot oil and with the main engine at very low number of revolutions (and therefore with a little delivery of the filling pump).

The purpose of taking up the oil before the valve 30 is that of taking it under a slight pressure in order to remove the possibly incorporated air (the inlet of the duct 13 must be located in the top portion of the chamber of the spring 29) and under pressure variable with the variation of the number of revolutions of the engine so that the amount of the oil outflowing from the duct 13 will be greater when greater is the delivery of the pump and when it more interesting that the rotary portion of the gear will not contact the oil within the sump.

I claim:

1. A continuously variable speed change gear for vehicles having an internal combustion engine and an accelerating pedal, comprising in combination an output shaft, an input shaft, a hydraulic multi-cylinder pump, a cylinder body for said pump rigidly connected to said input shaft and rotatably supported on said output shaft, a hydraulic multi-cylinder motor, a cylinder body for said motor having a concave face rigidly connected to said output shaft and concentrically surrounding said cylinder body of said pump, a stationary gear housing surrounding said motor and pump, two bearings arranged respectively at the ends of said gear housing for rotatably supporting said input shaft and said output shaft, said housing having a semi-annular hollow recess for oil, an oil sump communicating with said hollow recess, float means for maintaining constant the oil level of said sump, a pump swash plate pivoted to said motor cylinder body in correspondance to an axis offset with respect to said output shaft, a motor swash plate pivoted to said stationary gear housing, a distributor plate having a convex face rigidly secured to said motor cylinder body and contacting with its convex face said concave face of said cylinder body, said distributor plate having ducts for conveying the pump fluid to said motor pistons, a stationary eccentric ring secured to said bearing of said input shaft for conveying the motor fluid to said pump pistons, control piston means slidably arranged on said output shaft within said motor cylinder body and hydraulically operated for changing the inclination of said pump swash plate to cause said pump swash plate to assume one of four positions, namely negative inclination, zero inclination, partial positive inclination and maximum positive inclination, a connecting rod pivotly secured to said motor swash plate for changing the inclination thereof from zero to a maximum value, a gear control block secured to said gear housing and operatively connected to said pump and motor and to said accelerating pedal, a filling pump hydraulically controlled by said internal combustion engine and connected to said sump and to said gear control block.

2. A change speed gear as claimed in claim 1, wherein said control block comprises a first duct hydraulically connectable to said pump and motor when said internal combustion engine is braking, a second duct hydraulically connectable to said pump and motor when the internal combustion engine is tractive, a third duct connected to said filling pump for filling said speed gear, a fourth duct connected with said oil sump, a capillary duct connected to said hollow recess of said gear housing, a fifth duct hydraulically connected with said control piston means of said pump swash plate, a first distributor slidably arranged in said block having a first annular recess, a second annular recess, a cross hole and an end exhaust recess, a valve duct connecting said first and second ducts to one another, a ball valve arranged in said duct to automatically shut off one of said first and second ducts, means connecting said valve duct with said first duct through said first annular recess of said first distributor, a driver operated hand lever pivoted to said first distributor for controlling the positions thereof in said control block, a second distributor slidably arranged in said block having an annular recess at its intermediate portion for connecting said second duct with said fifth duct, said second distributor being connected at one end with said accelerating pedal and being chamfered at its other end, a plunger slidably arranged in said block and having a pressure chamber and a pressure duct connecting said pressure chamber with said valve duct, a coil spring arranged around said plunger in a chamber of said block, one end of said plunger being connected to said connecting rod for controlling the inclination of said motor swash plate, a hollow piston slidably arranged within the other end of said plunger, said plunger having a longitudinal groove connecting said chamber with said block and connectable through said second annular recess of said first distributor with said annular recess of said second distributor, a third distributor slidably arranged within said piston and a central bore of said plunger, said third distributor having a first head abutting on a tapered end of said central bore and an annular recess for connecting said pressure duct with said chamber of said block, a gauge spring arranged around said distributor and resting at one end on said plunger and at the other end on a second head of said distributor, a cap sealingly secured to said control block to form a chamber with said piston, a duct in said cap for connecting said last chamber with said third duct through said first distributor and a recess provided in said block, a needle spring valve arranged in said recess, a control pin projecting at one end into said first duct and at the other end into said recess to rest on said valve for closing said cap duct when said first duct is under oil pressure, a push rod entering perpendicularly in the bore containing said second distributor to cooperate with the chamfered end thereof, a coil spring abutting at one end said push rod, a poppet valve resting on the other end of said coil spring, a passageway connecting the room containing said spring with said third duct, a ball valve closing said passageway, said room being connected with said capillar duct, a horseshoe-shaped duct connected at one end to said filling pump and at the other end to said third duct, a ball valve arranged in a widening of said second duct connected with said first duct, a gauged spring pressing said ball valve onto said second duct, said spring being gauged to cause said valve to open for limiting the maximum pressure in said second duct, a control recess in said block wherein enters a stem of said poppet valve, a membrane abutting said valve stem and dividing said control recess in an upper chamber and in a lower chamber, said chambers being connected respectively through a hole to the outer and inner point of a radial section of said horse shoe-shaped duct, whereby by operating said hand lever following operative position of the change gear may be obtained, automatic operation position, constant ratio position, variable ratio position and reverse position, said positions corresponding respectively to the following positions of the first distributor (a) the cross hole of said first distributor connecting the cap chamber with the third duct, (b) the cross hole shutting off the above connection, (c) the exhaust recess of the first distributor connected through the needle valve recess with said cap chamber, the first annular recess of said distributor connecting said valve duct with said first duct, and (d) the exhaust recess connected with the needle valve recess and the second annular recess connected with said valve duct.

3. A change speed gear as claimed in claim 1 wherein said control piston means for changing the inclination of said pump swash plate comprise a first piston rotatably and slidably arranged on said output shaft, a second piston slidably supported on said first piston, an annular stop rigidly secured to said motor cylinder body, said first piston having a projection cooperating with said second piston and forming at one end a pressure chamber with said motor cylinder body, the other end of said first piston acting on said pump swash plate to change the inclination thereof, and an oil intake element connecting said pressure chamber with said control block, whereby said pistons act together upon said pump swash plate to an intermediate position of said plate and the successive action is carried out by said first piston while the second piston rests on said annular stop.

References Cited by the Examiner
UNITED STATES PATENTS

| | | | |
|---|---|---|---|
| 2,931,250 | 4/1960 | Ebert | 74—472.1 X |
| 2,973,669 | 3/1961 | Quigley. | |
| 2,994,233 | 8/1961 | Gerard | 74—472.1 X |
| 3,008,341 | 11/1961 | Cobb | 74—472.1 |
| 3,058,297 | 10/1962 | Tolley. | |

DON A. WAITE, *Primary Examiner.*